United States Patent [19]

Weber et al.

[11] Patent Number: 5,016,572
[45] Date of Patent: May 21, 1991

[54] PET FOOD PACKAGE AND DISPENSER

[75] Inventors: Frank J. Weber, St. Louis, Mo.;
Lance R. Liljeqvist, Norwalk;
Richard S. Prisco, Milford, both of
Conn.

[73] Assignee: Ralston Purina Company, St. Louis, Mo.

[21] Appl. No.: 472,023

[22] Filed: Jan. 30, 1990

[51] Int. Cl.⁵ ............................................. A01K 39/00
[52] U.S. Cl. ............................................. 119/52.1
[58] Field of Search ................ 119/52.1, 51.5, 61,
119/74, 77; 222/184, 185, 457; 43/131

[56] References Cited

U.S. PATENT DOCUMENTS

| | | | |
|---|---|---|---|
| 3,720,184 | 3/1973 | Pearce | 119/77 X |
| 3,730,141 | 5/1973 | Manning et al. | 119/52.1 X |
| 4,034,715 | 2/1977 | Arner | 119/51.5 |
| 4,281,624 | 8/1981 | Raines | 119/52.1 |
| 4,303,039 | 12/1981 | Thibault | 119/52.1 |
| 4,721,063 | 1/1988 | Atchley | 119/52.1 |
| 4,840,143 | 6/1989 | Simon | 119/52.1 |
| 4,840,715 | 6/1989 | Simon | 119/52 R |

FOREIGN PATENT DOCUMENTS 2227819 1/1975 France ................................ 119/77

Primary Examiner—Gene Mancene
Assistant Examiner—R. Thomas Price
Attorney, Agent, or Firm—Virgil B. Hill

[57] ABSTRACT

A pet or animal food package and dispenser includes a food container having a bottom portion which defines a discharge opening. A removable closure or seal is secured to the container for retaining a pet food product therein. A dispensing tray includes a forward portion defining a feeding area and a rear portion defining a container mounting area. The portions are joined by a sloping ramp. A cooperating track and groove arrangement on the container and tray removably mount the container to the dispensing tray.

9 Claims, 3 Drawing Sheets

PET FOOD PACKAGE AND DISPENSER

BACKGROUND OF THE INVENTION

The present invention relates to pet or animal food packaging and more particularly to device for storing and dispensing pet foods.

Heretofore, a wide variety of methods have been proposed for packaging and/or dispensing pet or animal foods. Typically, foods such as those for cats, dogs and other small pets are packaged by the producer in boxes or bags. A pet owner will dispense the food into a dish or bowl each time the pet is fed. Feeding the pet, therefore, becomes a daily chore.

Attempts have been made to provide pet food feeders which store an extended supply of food and dispense the food into a tray upon demand. Such feeders eliminate the daily feeding chore. Such devices typically include a food container and a tray. If the container is made separable from the tray to facilitate filling, provision must be made to interconnect the container and tray to avoid inadvertent spilling. The attachment method must be sufficiently secure to prevent the pet from separating the container and tray while still permitting easy separation by the pet owner.

An example of one such pet food dispenser may be found in commonly owned U.S. Pat. No. 4,034,715 entitled Convertible Pet Feeder and Method and issued on July 12, 1977 to Arner. The feeder disclosed therein includes a separable feeding tray and a container. The container is adaptable to hold and deliver dry pet foods or liquids. An example of another such device may be found in U.S. Pat. No. 4,840,143 entitled Pet Food Dispenser and issued on June 20, 1989 to Simon.

The dispensing devices or feeders heretofore provided have been sold separately from the pet or animal food. The pet owner is required to fill the food supply container each time the device is used. A need exists for a pet food dispenser and packaging system which may be filled by the food producer and purchased by the pet owner. A need exists for a pet food dispenser which is easily useable, relatively inexpensively manufactured and which is reliable in use.

SUMMARY OF THE INVENTION

In accordance with the present invention, the aforementioned needs are substantially fulfilled. Essentially, an animal or pet food container is provided which includes joined walls and defines a discharge opening. A removable closure closes and seals the discharge opening so that the container may be used as the sales packaging for the animal food. In addition, a dispensing tray is provided which defines a forward, feeding area and a rear mounting or container support area. Provision is made for removably interconnecting the dispensing tray and the food container. In narrower aspects of the invention, the dispensing tray defines a pair of spaced, generally parallel, elongated guide tracks. The tracks cooperate with correspondingly configured grooves formed in the side of the container to mount the container on the tray.

In accordance with the present invention, the food container is filled by the producer and sold to the pet owner. The closure means is readily removed and the container is joined to the dispensing or self feeder tray or base. It is presently preferred that the container and tray be molded plastic items and that the container define an integral carrying handle.

DETAILED DESCRIPTION OF THE PREFERRED EMBODIMENT

Figure 1:
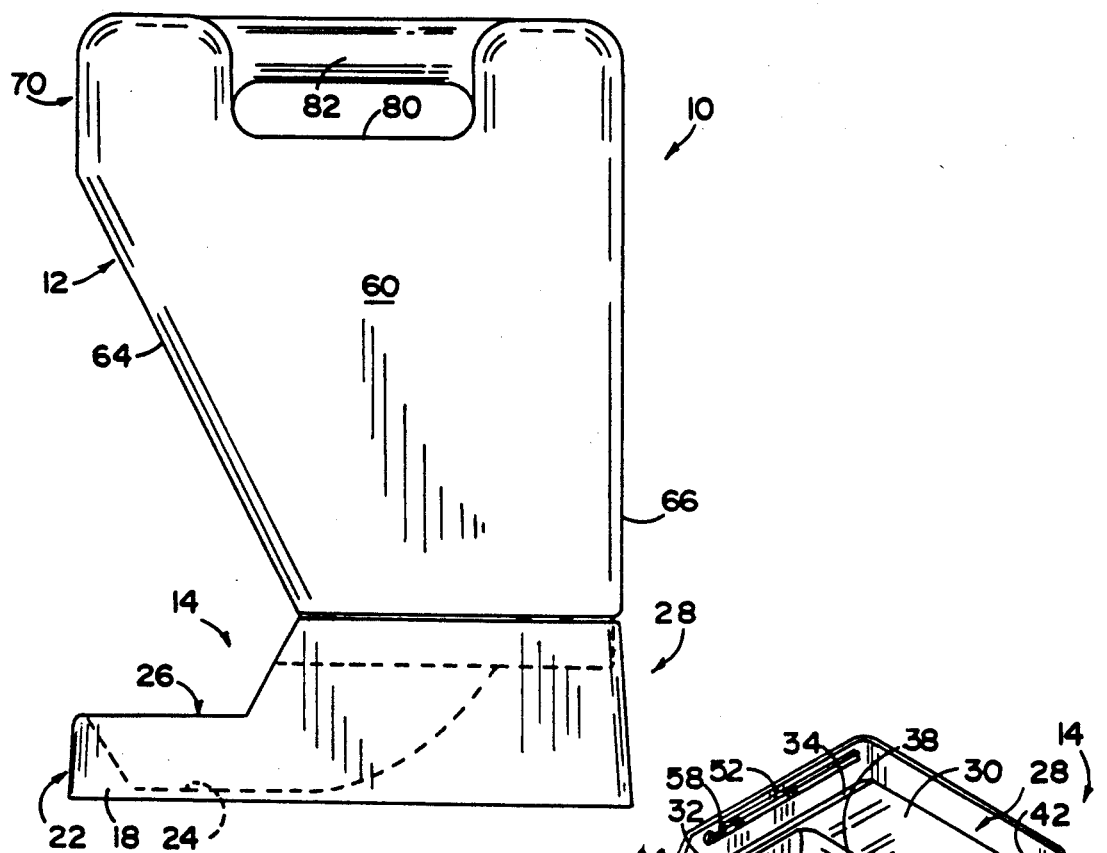
FIG. 1 is a side, elevational view of a pet or animal food dispenser including a container and feeding tray in accordance with the present invention.

A preferred embodiment of an animal or pet food dispenser in accordance with the present invention is illustrated in FIG. 1 and generally designated by the numeral 10. Dispenser 10 includes a container or food package 12 and a base or dispensing tray 14. Container 12 and base 14 are selectively interconnectable, as discussed in more detail below, to form a self feeder.

Figure 2:
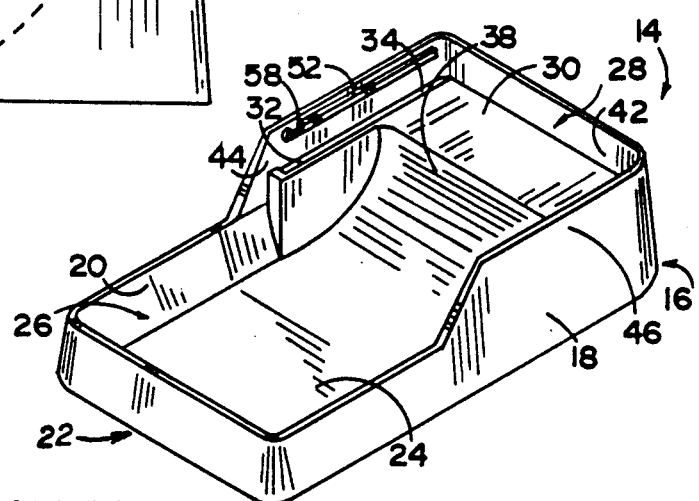
FIG. 2 is a perspective view of a feeding tray in accordance with the present invention.
Figure 3:
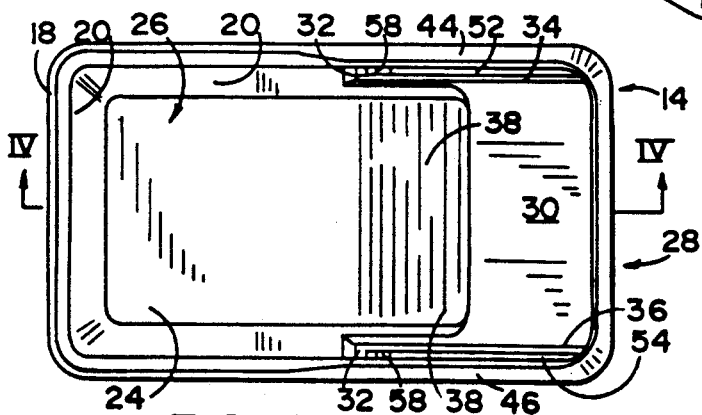
FIG. 3 is a top, plan view of the dispensing tray.
Figure 4:
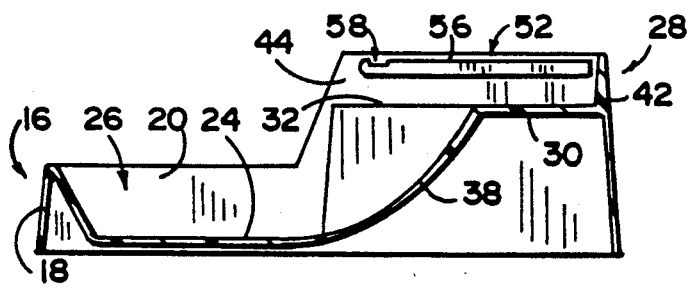
FIG. 4 is a cross sectional view taken generally along line IV—IV of FIG. 3.
Figure 5:
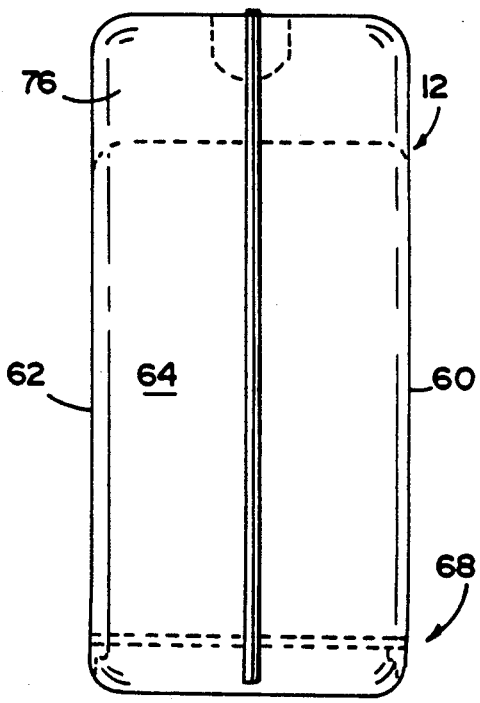
FIG. 5 is a front, elevational view of a pet food container in accordance with the present invention.
Figure 6:
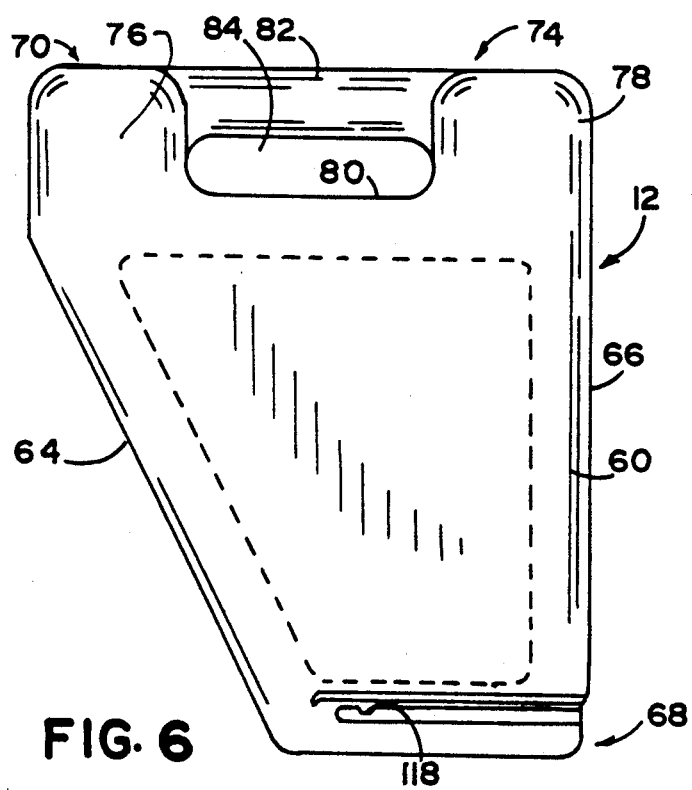
FIG. 6 is a side, elevational view of the container.

As seen in FIGS. 2, 3 and 4, base or dispensing tray 14 has a tiered shape and includes a peripheral wall 16. Wall 16 includes an outer wall 18 and a joined inner wall or surface 20. A forward portion 22 of tray 14 includes a bottom 24 which in conjunction with wall surface 20 defines a forward feeding area 26. A rear portion 28 of tray 14 defines a container mounting area. Portion 28 includes a generally planar support surface 30 joined with ledges 32. Ledges 32 extend outwardly towards portion 22 along lateral edges 34, 36 of portion 28. As best seen in FIGS. 2 and 4, bottom 24 and surface 30 are joined by a curved or sloping ramp 38. Wall 16 extends upwardly above surface 30 and ledges 32. Wall 16, therefore, includes a rear wall portion 42 and side wall portions 44, 46.

A container mounting structure is formed integral with side wall portions 44, 46 of tray 14. As shown, the mounting structure includes a pair of elongated, laterally spaced, parallel guide tracks or flanges 52, 54. Tracks 52, 54 extends generally parallel to and spaced above ledges 32, 34, respectively. Flange or guide track 52 extends rearwardly along a substantial portion of the lateral edge of support surface 30. An upper surface 56 of track 52 defines a slot or notch 58. Guide track 54 is identical in configuration to track 52. The tracks and their corresponding notches 58 cooperate with the container 12. It is presently preferred that tray 14 be molded as a one-piece member from a suitable plastic.

As seen in FIGS. 5–9, container 12 includes spaced side walls 60, 62, a front wall 64, a rear wall 66, a base portion 68 and a top portion 70. In the preferred form, front and rear walls 64, 66 diverge outwardly with respect to one another from base 68 upwardly towards the top portion 70. Side walls 60, 62 extend in spaced, parallel relationship to each other.

Upper portion 70 includes a handle 74 defined by upwardly extending container portions 76, 78 which are joined by a flat surface 80. A handle defining member 82 extends in spaced relationship to surface 80 Member 82 and surface 80 define an aperture 84. Handle member 82 and aperture 84 are dimensioned so that a purchaser may readily grasp container 12 at the handle portion for transport.

Figure 8:
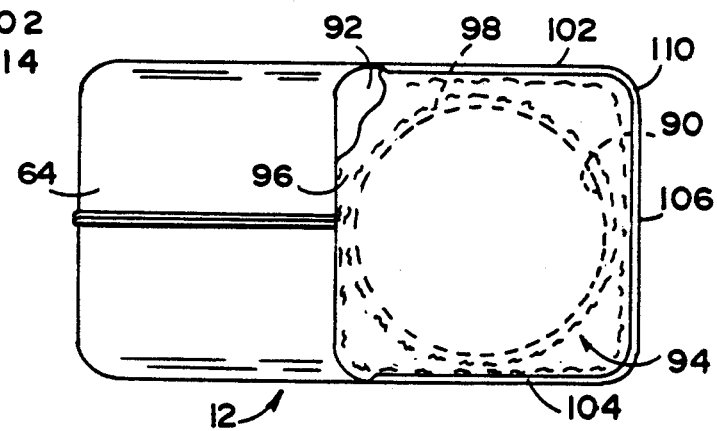
FIG. 8 is a bottom, plan view thereof.
Figure 9:
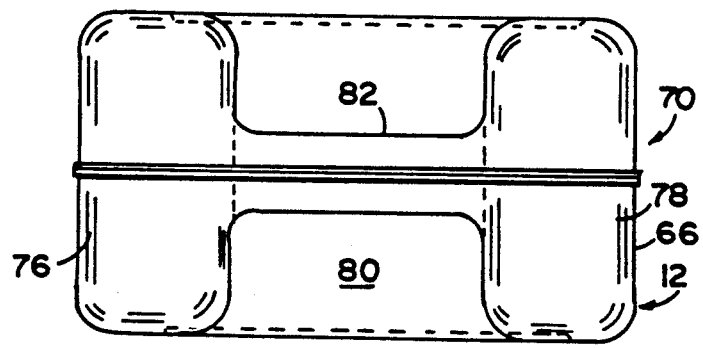
FIG. 9 is a top, plan view thereof.

Bottom portion 68 of container 12 is formed with a discharge opening 90 (FIG. 8). In the presently preferred form, opening 90 is a circular aperture formed in a generally planar surface 92 of base portion 68.

In accordance with the present invention, container 12 is filled with a suitable pet food of the dry, flowable variety at a food producers facility. A closure or seal means 94 is then applied to planar portion 92 to close and seal the discharge aperture 90. It is presently preferred that the closure 94 be a flexible foil sheet 96 cut and secured to portion 92 by a suitable peelable adhesive 98.

Figure 7:
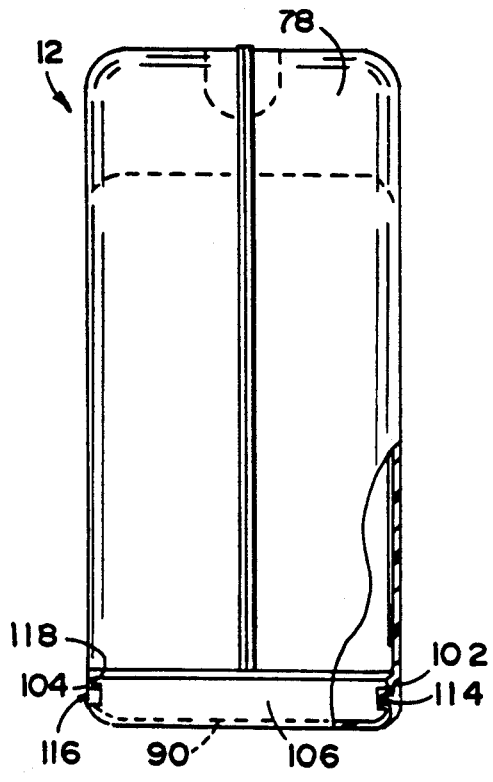
FIG. 7 is a rear, elevational view thereof.

Bottom portion 68 of container 12 further includes spaced side walls 102, 104 and a rear wall 106. As seen in FIGS. 7 and 8, walls 102, 104 and rear wall 106 are offset or spaced inwardly slightly from sidewall 60, 62 and rear wall 66 of container 12. The walls are dimensioned to be received within dispensing tray rear portion 28. The walls define a peripheral ledge 110 which will rest on an upper surface of walls 42, 44 and 46 of the dispensing tray. Side walls 102, 104 of bottom portion 68 define elongated, generally parallel grooves 114, 116. Grooves 114, 116 open rearwardly through wall portion 106. In addition, downwardly extending tabs or detents 118 are defined by side walls 102, 104. Detents 118 extend into the grooves of the side portions. The detents are positioned to cooperate with and be received within detent notches 58 formed in the guide tracks 52, 54 of the dispensing tray and retain the container on the tray. Container 12 is also preferably molded as an integral one-piece member from a suitable plastic.

In view of the above description, the operation of the present invention should now be readily apparent. A pet food producer or supplier will fill container 12 with a suitable quantity of pet food. Subsequent to the filling operation, closure means 94 is applied to seal the food. The pet owner may purchase the containers individually to use with a single feeding tray. In use, the removable closure means or foil seal is peeled off of the bottom portion of the container. When held in an inverted position, the container 12 may be slipped onto dispensing tray 14 by inserting guide tracks 52, 54 into grooves 114, 116. The tabs or detents 118 will snap into notches 58 formed in the guide tracks. The rounded forward ends of the tracks will cam the detents into the notches. Since container 12 is molded as in integral unit from a plastic material, it has sufficient flexibility to permit the tray and container to be interconnected. Bottom portion 68 of the container at surface 92 is supported by ledger 32 and rear support surface 30. The container abuts rear wall 42 and the tabs or detents are received within the notches. As a result, the container is securely retained. The container may not be moved backwardly and separated from the tray. Forward movement is resisted by the detents. The flowable food will exit discharge aperture 90 and slide down ramp 38 into feeding area 26. As food is consumed by the pet, the tray is automatically filled. The configuration of the container including the diverging front and rear walls 64, 66 ensures that food flows to the discharge opening.

The package, container and tray in accordance with the present invention permit the efficient packaging, transport and sale of pet food. Separate filling of a dispensing container is eliminated at the pet owner level. A multiple day supply of food is provided. The container is securely mounted on the tray yet easily removable by the pet owner. The mounting arrangement prevents inadvertent or accidental separation by the pet of the tray and the container. The tray is dimensioned to provide a stable platform or base so that the combination will not tip during normal use. The container may be reused after it is emptied or a new container and food package ca be purchased by the owner.

In view of the foregoing description, those of ordinary skill in art may envision various modifications which would not depart from the inventive concepts disclosed. For example, the handle could be fabricated as a separate item and attached to the container. It is therefore expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A pet food dispenser comprising:
    a food container having joined walls and defining a discharge opening;
    handle means on said container for defining a carrying handle;
    removable closure means on said container for closing said discharge opening after the container is filled with pet food, said closure means including a flexible sheet covering and sealing the discharge opening and permitting the container to be used for shipping, storing, selling and dispensing of pet food;
    a dispensing tray having a forward portion defining a feeding area and a rear container mounting portion said portions being joined together by a sloping ramp; and
    mounting means on said tray and said container for mounting said container to said tray in a positive, detent fashion so that the closure means can be removed, said container can be secured to said tray and food within the container will be dispensed into said feeding area of said tray, and wherein said mounting means comprises:
    a pair of spaced, elongate guide tracks extending along opposed, lateral sides of said container mounting portion, said container defining a pair of outwardly opening grooves dimensioned and configured to receive said guide tracks; and
    retaining means on said container and said tray for retaining said container on said guide tracks.

2. A pet food dispenser as defined by claim 1 wherein said handle means comprises said container defining an integral handle joined to said walls.

3. A pet food dispenser as defined by claim 2 wherein said container is molded from a plastic material.

4. A pet food dispenser as defined by claim 1 wherein said dispensing tray further defines a support ledge along said rear portion thereof.

5. A pet food dispenser as defined by claim 1 wherein said retaining means comprises:
    detents extending into said grooves, and wherein said guide tracks each define slots for receiving one of said detents.

6. A pet food container for use in shipping, storing, selling and dispensing pet food, said container comprising:

a one-piece molded plastic member defining a generally planar base portion, side walls, end walls and a top portion, said base portion defining a fill and discharge aperture, said end walls extending in a diverging relationship from said base portion towards said top portion;

a carrying handle integrally joined to said top portion;

mounting means on said member for mounting said member to a feeding tray; and removable closure means attached to said plastic member for closing and sealing said discharge aperture and permitting opening of said aperture to dispense food with the container, said closure means comprising a foil member adhesively attached to the base portion of said plastic member.

7. A pet food container as defined by claim 6 wherein said mounting means comprise:

a pair of elongated, generally parallel grooves defined by said side walls and a pair of detents, each detent extending into one of said grooves.

8. A pet food feeder, comprising:

a pet food container having end walls, side walls, a rear wall, a top portion and a bottom portion, said bottom portion including a surface defining a discharge opening, said bottom portion further including spaced sides, said end walls diverging outwardly from said bottom portion towards said top portion, said bottom portion of said pet food container further including a rear wall portion, said bottom portion sides and said rear wall portion being offset inwardly to define a peripheral ledge;

a handle joined to said pet food container;

a feeder tray having a peripheral wall, a forward bottom portion, a raised rear portion and a ramp joining said bottom portion and said rear portion, said feeder tray peripheral wall being dimensioned so that said peripheral ledge rests thereon;

a pair of spaced, generally parallel mounting tracks on one of said container and said tray and the other of said container and said tray defining spaced, generally parallel grooves dimensioned to receive said tracks; and retaining means on said container and said tray for retaining said tracks within said grooves, said retaining means comprising each of said tracks defining a notch and wherein said retaining means further includes a pair of detents configured to be disposed within said notches.

9. A pet food feeder as defined by claim 8 further including:

closure means on said container for closing said discharge opening.

* * * * *